United States Patent Office 3,488,467
Patented Jan. 6, 1970

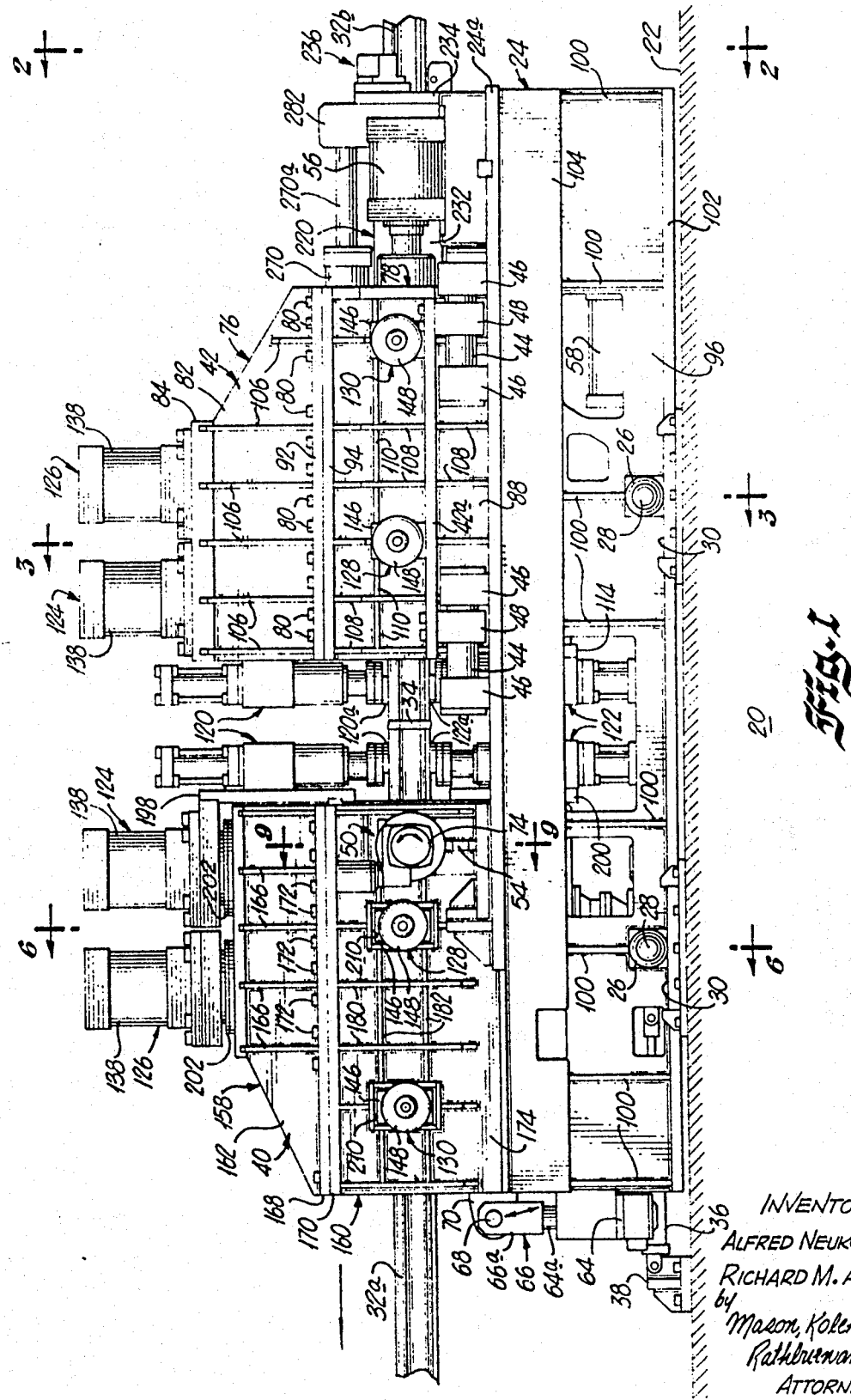

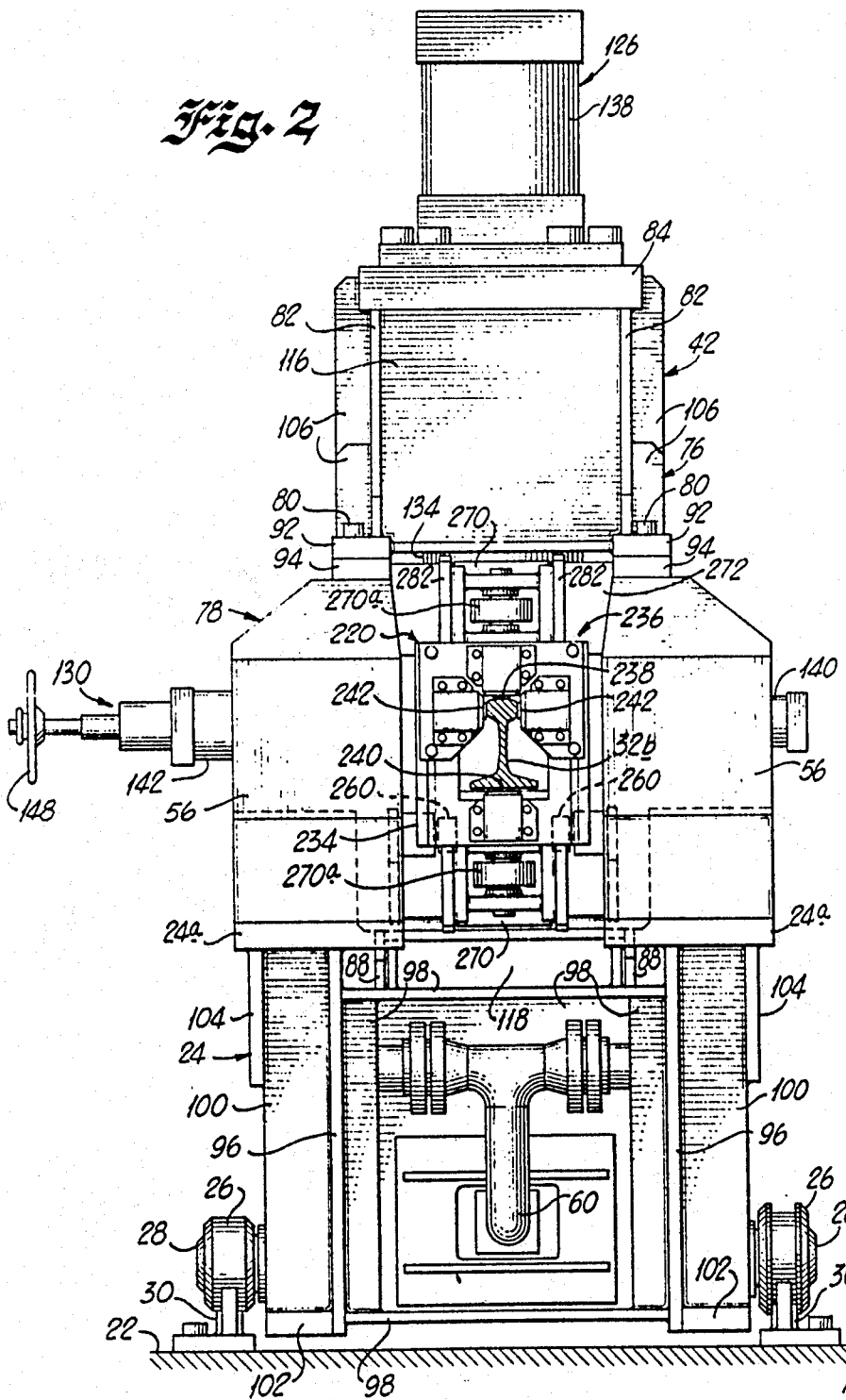

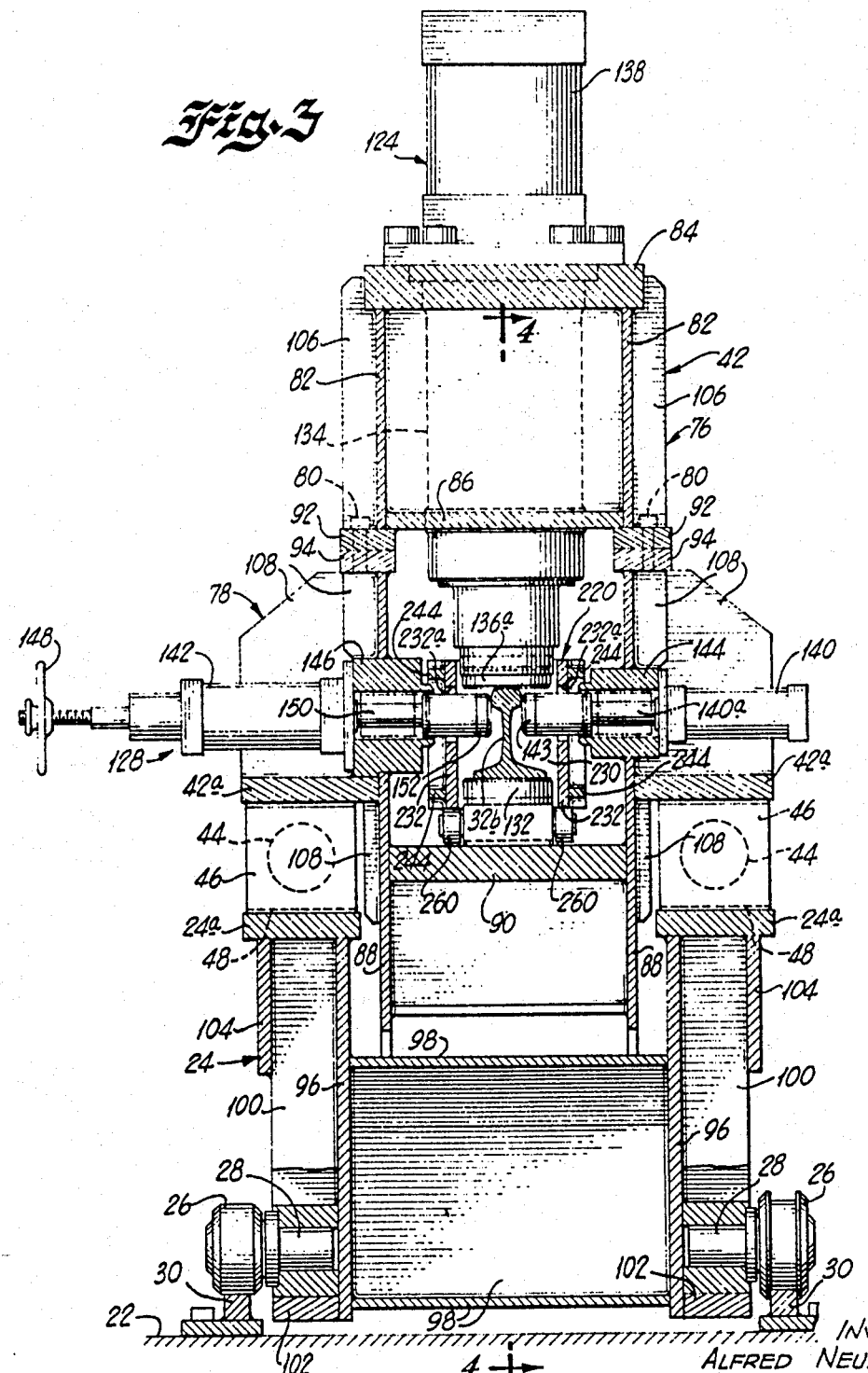

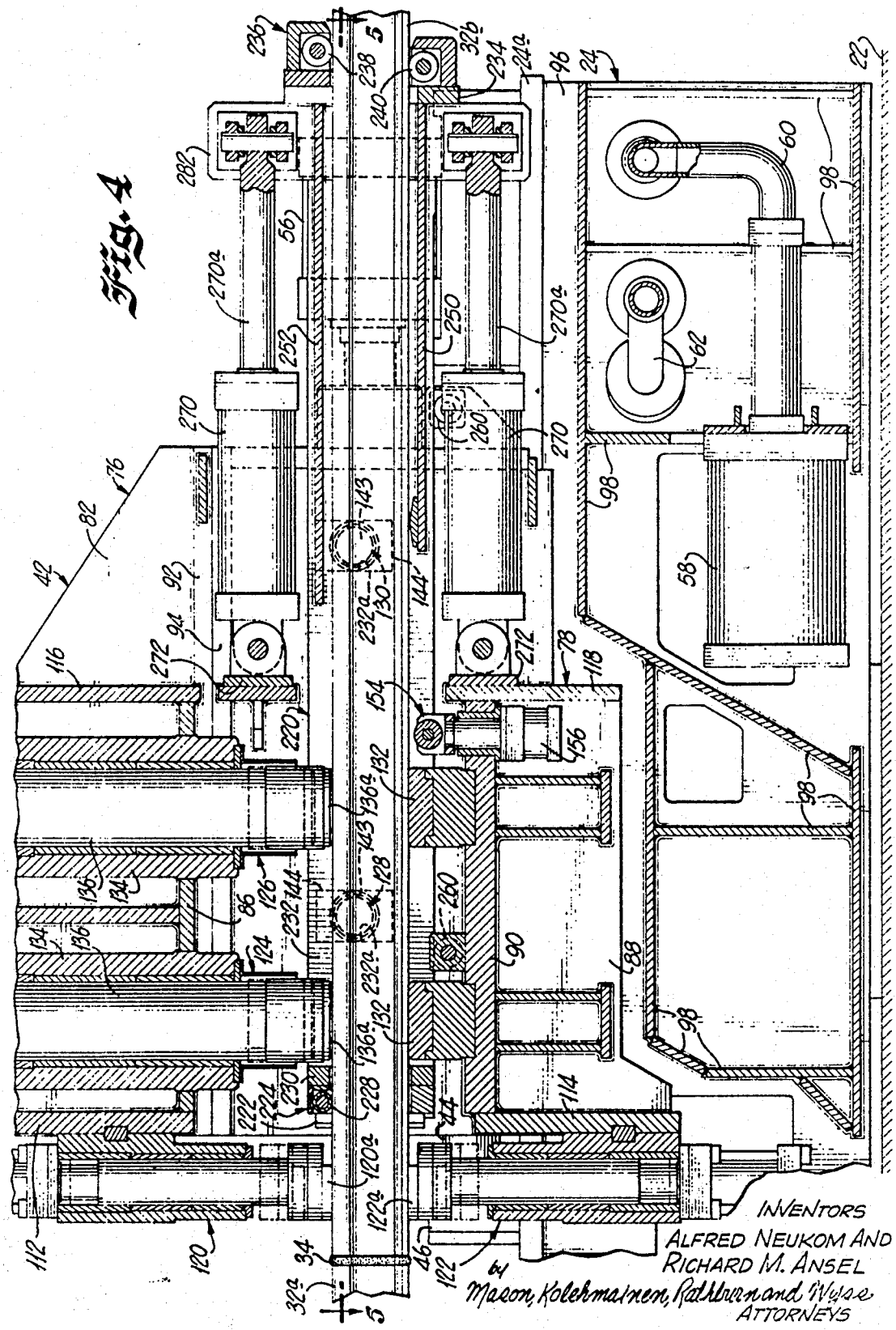

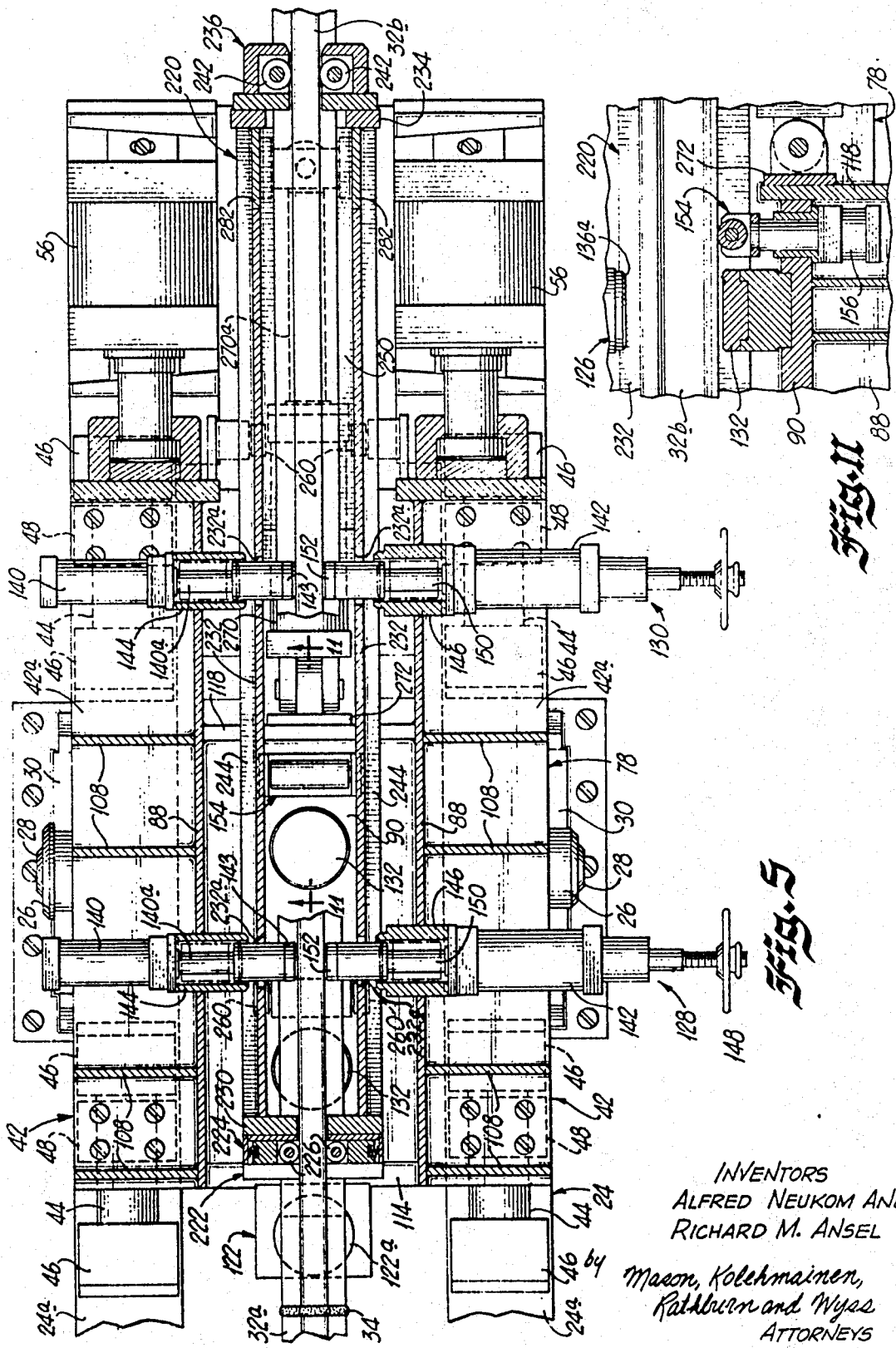

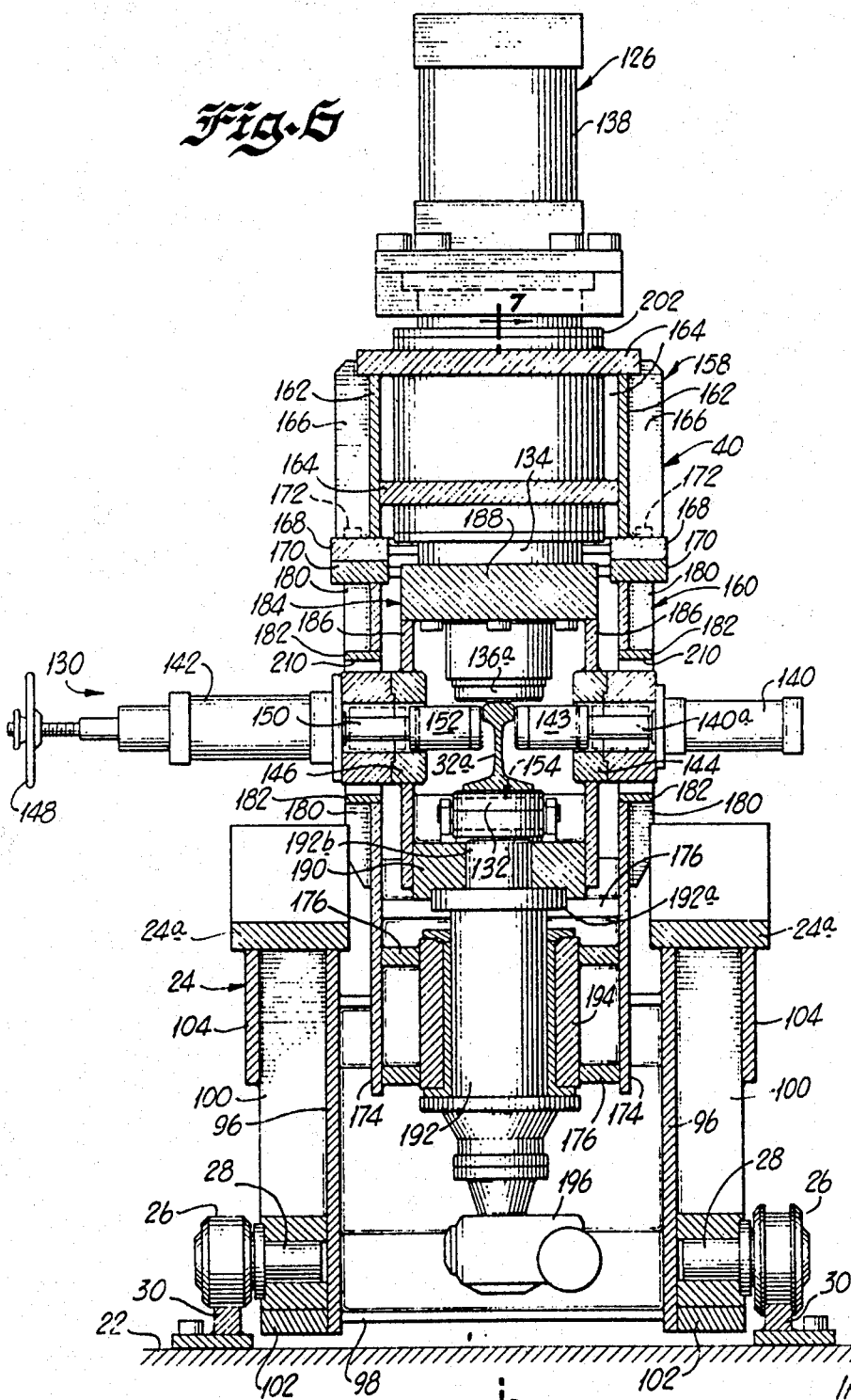

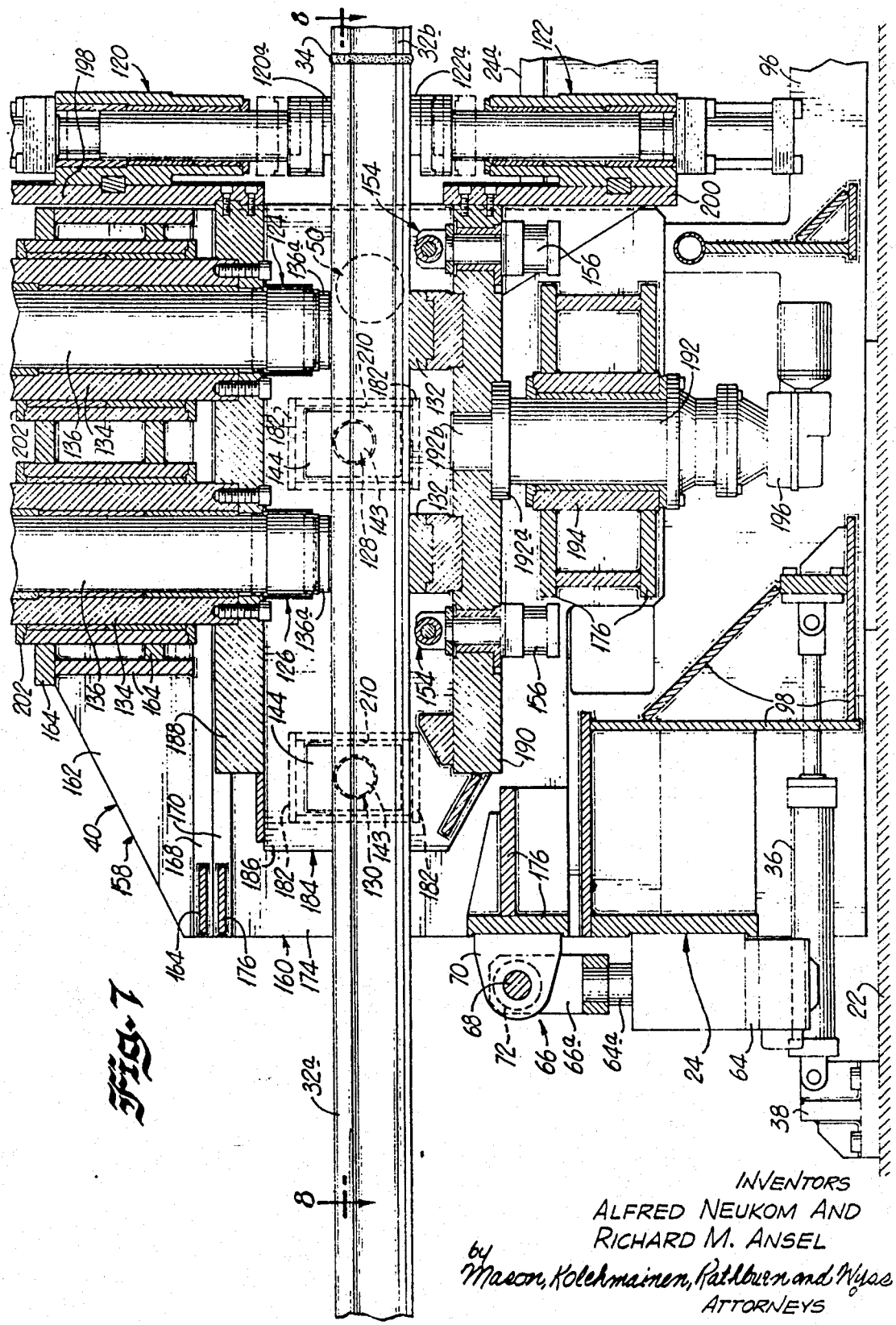

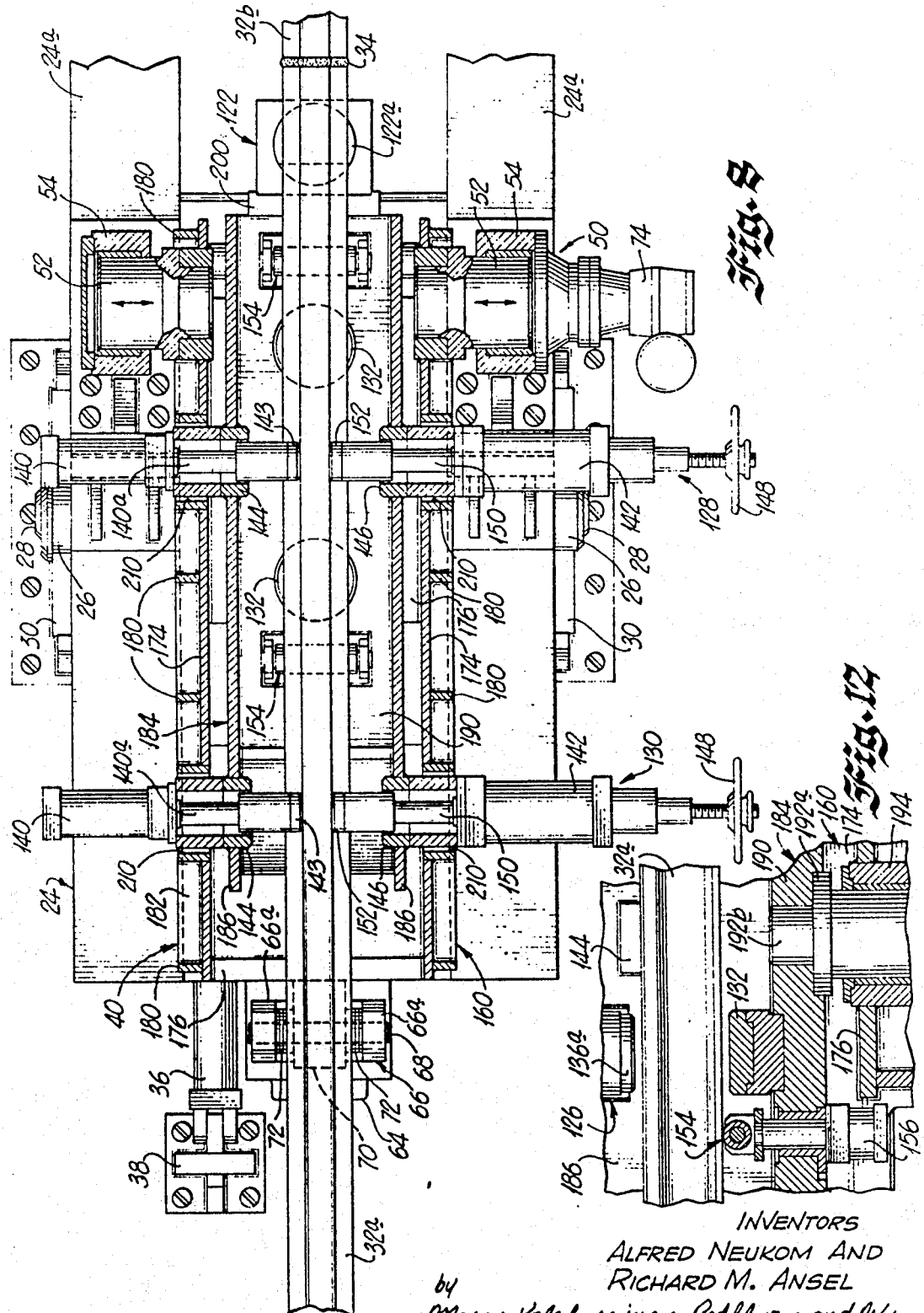

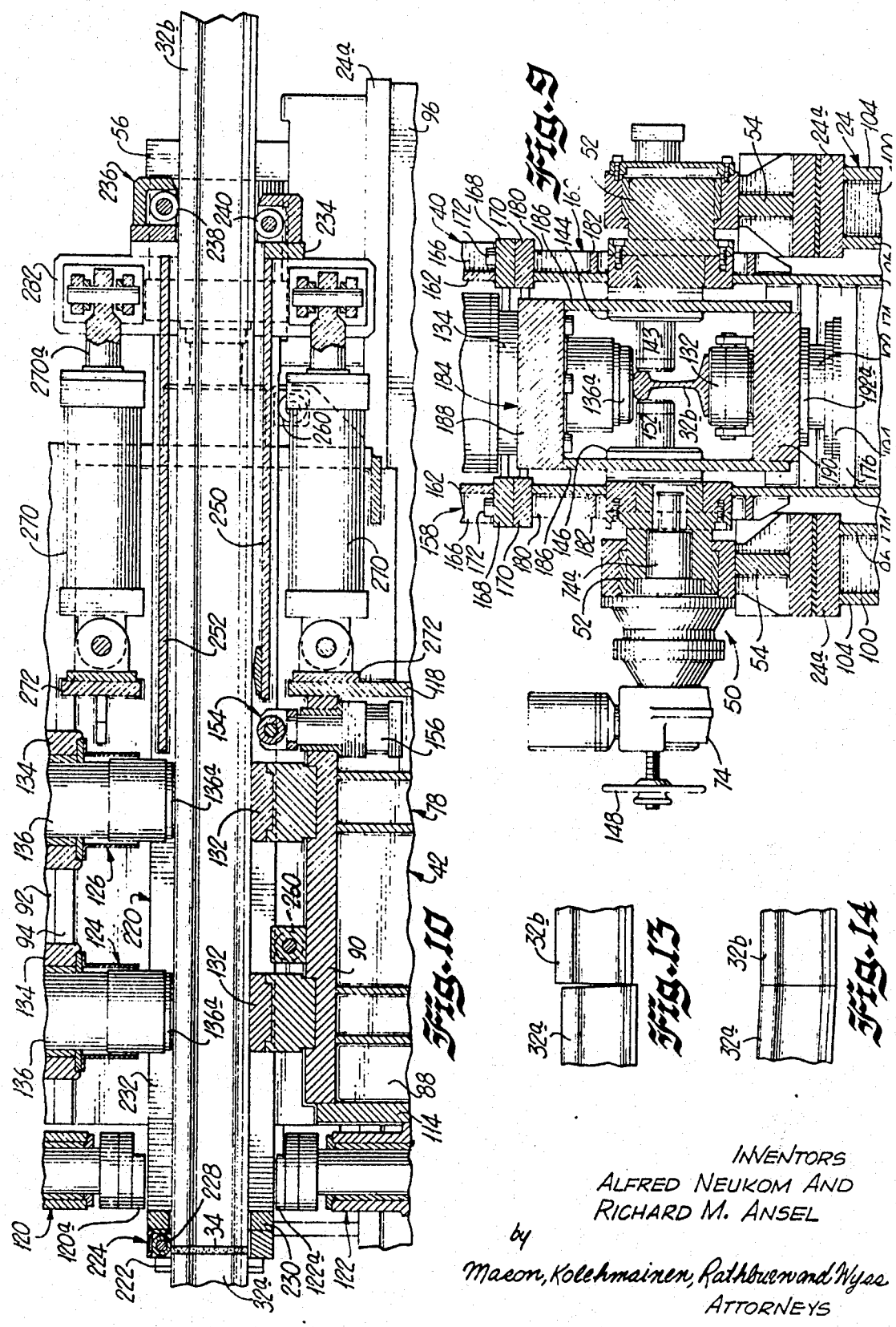

3,488,467
METHOD AND APPARATUS FOR WELDING RAIL SECTIONS TO FORM A CONTINUOUS RAIL
Richard M. Ansel, Oak Park, Ill., and Alfred Neukom, Duebendorf, Switzerland, assignors to Chemetron Corporation, Chicago, Ill., a corporation of Delaware
Filed Jan. 9, 1967, Ser. No. 608,194
Int. Cl. B23k 9/02
U.S. Cl. 219—101      17 Claims

ABSTRACT OF THE DISCLOSURE

A welding apparatus having a longitudinal base structure and a pair of platens mounted thereon. Each platen includes a plurality of movable clamping members adapted to engage a rail section and hold it against vertical, lateral and longitudinal movement with respect to said platen. One of the platens is movable longitudinally on the base to rock the rail section carried thereby in order to bring its end surface into parallel relationship with the end surface of the rail section carried by the other platen. One of the clamping means on this platen is also movable vertically thereon in order accurately to align and match the ends of the rail sections, thereby to provide a smooth top running surface across the welded joint of the rail sections. A shear box having knives at one end is mounted for longitudinal movement on the other platen and is so constructed that the knives can move from a retracted position longitudinally remote from the welded joint into a position to shear the upset material around the joint after the weld is completed without releasing at least one of the clamping members so that the welded rail section ends are still restrained against relative movement while the shearing of the upset material around the welded joint is accomplished.

---

The present invention relates to a new and improved method and apparatus for welding individual rail sections together in end to end relation to form a continuous rail and includes new and improved means for clamping the rail sections while they are being aligned for welding as well as new and improved means for shearing the upset formed around the weld joint. The present invention is an improvement over the method and apparatus shown in U.S. Patent No. 3,081,673 issued to Richard M. Ansel which is assigned to the same assignee as the present invention.

One of the problems associated with the welding of rail sections in end to end relation to form a continuous rail is that of obtaining welded joints between the individual rail sections making up the rail that are uniform in depth of weld and of high strength. Moreover, in the formation of a continuous rail it is important that the rail sections be accurately aligned and positioned to provide a smooth running surface for the railroad cars. In order to achieve these results the end faces of the rail sections must be properly aligned in substantially parallel planes when the welding takes place to provide for proper longitudinal alignment of the individual rail sections with each other. Many times the individual rail sections supplied by steel producers are not always sheared off or cut in such manner that their end faces lie exactly normal to the longitudinal axis of the rails and, as a consequence, when rail sections with these defects are welded together it is difficult to obtain a uniform, strong weld and these defects also aggravate the problem of obtaining a longitudinally straight, continuous rail string. Another problem associated with the welding of individual rail sections together is that of removing most of the upset or flash material formed when the ends of the rail sections are welded together in order that subsequent grinding required adjacent the welded areas may be reduced to a minimum.

It is desirable to remove the excess upset or flash material around the welded joint rapidly and smoothly while the metal is still hot and relatively soft, and further it is desirable that both of the rail sections which are joined be positively clamped or held in properly aligned relationship while such removal is taking place in order to avoid the possibility of jarring or knocking the rail sections out of alignment before the weld has hardened sufficiently to resist any shocks or vibration tending to cause such mis-alignment.

Accordingly it is an object of the present invention to provide a new and improved method and apparatus for welding longitudinal rail sections in end to end relation to form a continuous rail which reduces or eliminates the above mentioned problems.

Another object of the present invention is to provide a new and improved method and apparatus for welding rail sections of the character described which is capable of producing welds of uniform depth and penetration and consequent high strength even though the end faces of the individual rail sections which are welded together may not lie exactly normal to the elongitudinal axes of the rail sections.

Still another object of the present invention is to provide a new and improved method and apparatus of the character described for welding individual rail sections together and including new and improved means for removing the upset or flash material formed around the welded joints in order to reduce subsequent grinding operations to a minimum.

Another object of the present invention is the provision of a new and improved method and apparatus of the character described and including means for accurately and rapidly aligning the ends of the rail sections to be welded together so that uniform penetration and heating of the weld area may be obtained.

Yet another object of the present invention is to provide a new and improved method and apparatus of the character described including means for angularly adjusting or moving the end of one rail section until the latter end has its face lying parallel with the end face of an adjacent rail section to which it is to be joined, thereby insuring uniform penetration of the weld in both rail sections and thus forming a strong welded joint.

Another object of the present invention is the provision of a new and improved method and apparatus of the character described wherein means are provided to angularly adjust or move the end of one rail section until its end face lies parallel with the end face of an adjacent rail section and wherein means are also provided for adjusting or moving one rail section laterally and/or transversely relative to the other until the top running surfaces of the two rail sections adjacent the welded joints are properly aligned with the individual rail sections in longitudinal alignment.

Yet another object of the present invention is the provision of a new and improved method and apparatus of the character described wherein the welding and upset removal operation is accomplished rapidly and accurately while the welded joint is still hot and soft and while the rail sections remain clamped or held to avoid the posisibility of inadvertent misalignment while the welded joint is cooling.

A further object of the present invention is the provision of a new and improved method and apparatus of the character described which may be readily operated by an unskilled operator and is still capable of producing high quality weld very quickly and inexpensively.

Briefly, the foregoing and other objects and advantages of the present invention are accomplished by a new and improved method which includes the steps of holding or clamping the individual rail sections which are to be welded together against relative movement with the sections in exact longitudinal alignment and with their adjacent faces lying in closely adjacent parallel planes. One of the rail sections is rocked about a transverse axis to bring its end face in precise laterally facing relation with the end of the other rail section whereupon the two rail sections are moved vertically relative to one another to accurately align the ends of the rail sections longitudinally with their end faces in directly matched facing relation. The aligned ends of the rail sections are heated to welding temperature by the well known flashing process wherein the rail sections are relatively moved longitudinally while held against vertical and lateral movement. As will be understood by those skilled in this art, the heating is accomplished by reciprocating one of the rail sections longitudinally with respect to the other at a predetermined rate so that the ends of the rail sections periodically engage to cause current to flow between spaced apart electrodes in engagement with the rail sections which current flows through the engaging ends of the rail sections to create heat for softening the rail section ends. After a predetermined number of such reciprocations the heated ends of the rail sections are urged together by a large force to form the welded joint and, at the same time, to create an upset of excess metal around the joint. As soon as the welded joint has been thus formed the excess upset material around the weld is removed while the individual rail sections are restrained against longitudinal, vertical and lateral movement.

Very briefly, apparatus characterized by the features of the present invention includes a base extending longitudinally of the rail sections to be welded together and first means mounted on the base for holding one of the rail sections against vertical and lateral movement during the welding operation. A second means is mounted on the base for holding the other rail section against lateral and vertical movement and means are provided for rocking one of the rail sections so held about a transverse axis until the end face of the latter section is properly positioned relative to the end face of the adjacent rail section. Means are also provided for moving one of the rail sections transversely with respect to the other in order to accurately align the ends of the rail section longitudinally and in matched facing relation. Means including spaced apart electrodes in engagement with the rail sections are provided for passing current through the adjacent ends of the rail sections to heat these to a welding temperature as one of the rail sections is reciprocated longitudinally relative to the other by suitable means, thereby to move the ends of the two rail sections periodically into and out of engagement. When the rail section ends are sufficiently heated, the reciprocating means is rendered effective to force the rail sections together while these sections are restrained against vertical and lateral movement, thereby to form the weld. The apparatus further includes means for removing the excess upset or flash material formed around the welded joint while the rail sections remain clamped or held against vertical, lateral and longitudinal movement.

The invention, both as to its organization and manner of operation, together with further objects and advantages, will best be understood by reference to the following detailed description taken in conjunction with the accompanying drawings, wherein:

FIG. 1 is a side elevational view of a new and improved welding apparatus characterized by the features of the present invention;

FIG. 2 is an enlarged, end elevational view of the apparatus looking in the direction of the arrows 2—2 in FIG. 1;

FIG. 3 is an enlarged, sectional view taken along a line substantially corresponding to line 3—3 in FIG. 1 and illustrates particularly the construction of one of the rail holding platen assemblies of the present invention;

FIG. 4 is a sectional view taken along a line substantially corresponding to line 4—4 in FIG. 3;

FIG. 5 is a sectional view taken along a line substantially corresponding to line 5—5 in FIG. 4;

FIG. 6 is an enlarged sectional view taken along a line substantially corresponding to line 6—6 in FIG. 1 and illustrates particularly the other rail holding platen assembly of the present invention;

FIG. 7 is a sectional view taken along a line corresponding substantially to the line 7—7 in FIG. 6;

FIG. 8 is a sectional view taken along a line substantially corresponding to line 8—8 in FIG. 7;

FIG. 9 is a sectional view taken along a line corresponding substantially to line 9—9 in FIG. 1 and illustrates particularly the means for pivotally supporting the paten assembly illustrated in FIGS. 6 through 8;

FIG. 10 is a fragmentary, sectional view similar to FIG. 4 but illustrates particularly a shearing box assembly constructed in accordance with the present invention;

FIG. 11 is a fragmentary sectional view similar to FIG. 10 but illustrates particularly means for supporting the rail sections during longitudinal movement in the platen assembly of FIGS. 3 through 5;

FIG. 12 is a fragmentary sectional view similar to FIG. 7 but illustrates particularly means for supporting the rail sections during longitudinal movement in the platen assembly illustrated in FIGS. 6 through 8;

FIG. 13 is a side, elevational view of the adjacent end portions of a pair of rail sections which are to be welded together and shows the rail sections in an exaggerated misaligned position; and FIG. 14 is a view similar to FIG. 13 but shows the rail sections in abutting position after alignment in accordance with the present invention.

Referring now to the drawings, and first to FIG. 1, there illustrated is a new and improved apparatus referred to generally by the reference numeral 20 for welding rail sections together in end to end relation to form a continuous rail. The apparatus 20 is adapted to be mounted on a floor 22 of a railroad car or the like and may be used in connection with the method and apparatus shown and described in Baer et al. U.S. Patent No. 3,030,494 in place of the welding and shearing apparatus there disclosed.

Referring specifically to the latter, means are disclosed therein for feeding rail sections onto a roller system and for moving the rails longitudinally into a welding apparatus adapted to weld the ends of the rails together. After each weld is formed the rail string is moved longitudinally into a grinding station where a grinding operation is performed on the area around the joint. After grinding the welded rail string is moved by a pusher out of the end of the railroad car and the next rail section to be joined to the string is moved into proper position in the welding apparatus.

The welding and shearing apparatus of the present invention includes a longitudinally extending base 24 which is mounted for longitudinal movement with respect to the rail string on the floor 22 by means of a plurality of rollers 26 (FIGS. 1, 2 and 3). As is best shown in FIGS. 2, 3 and 6 each rollers 26 is supported on a laterally and outwardly extending short axle 28 and the rollers are adapted to roll on short tracks 30 which are secured at fixed locations to the floor 22. The base structure 24 of the welding apparatus is thus movable longitudinally relative to other equipment in the system so that the apparatus 20 may be positioned to weld rail sections of different lengths customarily supplied by mills. Thus, the welding apparatus is preferably so positioned that the end of the rail section 32b to be welded to the string 32a will abut the string at the desired welding location indicated generally by the reference numeral 34 in FIG. 1 and lying intermediate the ends of the apparatus 20.

The rail string 32a is moved through the apparatus 20 from right to left as viewed in FIG. 1 as each additional section 32b is joined to the string.

In order to move the welding apparatus 20 longitudinally along the tracks 30 a horizontally disposed hydraulic cylinder 36 is connected between the base 24 and a bracket 38 which is bolted to the floor of the railway car. Normally, after the welding apparatus 20 has been properly positioned for rail sections of a selected length, it is not necessary to reposition the base each time a new rail section is brought into position for welding to the rail string. Each time rail sections of different lengths are to be welded the cylinder 36 is actuated to move the base structure 24 to the left or right as required so that the ends of the rails will always be in the proper position with respect to the welding apparatus.

After a weld has been made in the manner described hereinafter, the continuous string 32a is moved from right to left until the end of the string is positioned at the desired location for welding. A new rail section 32b to be added is then moved longitudinally (from right to left) into the welding apparatus 20 until its end abuts the end of the string 32a. The next welding operation is then performed and the upset around the weld area 34 is sheared in a manner discussed more fully hereinafter. The cycle described above is repeated until a rail string of the required length has been formed.

In order to support, hold and align the rail string 32a and the rail section 32b, the welding apparatus 20 includes a pair of longitudinally spaced platen assemblies 40 and 42 mounted on the base 24 and spaced on opposite sides of the weld area 34 between the abutting ends of the rail sections. The platen assembly 42 is adapted to support the rail section 32b and, in order to permit the aforementioned reciprocating movement of the rail section during the welding operation, this platen assembly is mounted for longitudinal movement on the base 24 upon pairs of horizontally extending support rods 44 (FIGS. 1). Each rod 44 is secured to the base 24 by a pair of stop blocks 46 positioned at opposite ends thereof and the stop blocks 46 are welded or otherwise secured to the upper surface of a pair of elongated outwardly extending, horizontal upper flanges 24a of the base 24, as is best shown in FIGS. 1 and 3.

The platen assembly 42 includes a pair of outwardly extending, longitudinal flanges 42a overlying and in parallel spaced relation with the base flanges 24a (FIG. 1) and a plurality of platen supporting slide blocks 48 are mounted on the underside of the platen flanges. Each slide block has a horizontal bore to permit the block to slide along the support rods 44 so that the platen assembly 42 can be reciprocated longitudinally with respect to the base 24 for a distance limited by engagement of the slide blocks 48 with stop blocks 46.

The platen assembly 40 is mounted for pivotal or rocking movement on the base 24 about a horizontal axis extending transversely of the rail string 32a and, to this end, a bearing or journal assembly 50 is mounted on the base structure as is best shown in FIGS. 1, 8 and 9 of the drawings. A pair of outwardly extending, horizontal stub axles 52 are respectively secured at their inner ends to opposed side plates of the platen assembly 42 and the stub axles 52 are supported for pivotal movement by two aligned bearings 54 respectively mounted on the upper surface of the two longitudinally extending base flanges 24a. The platen assembly 40 is restrained against longitudinal movement on the base 24 but is pivotable or rockable about a horizontal axis formed by the bearings 54 at a point spaced substantially from the end of the rail string 32a.

The longitudinal reciprocation of the platen assembly 42 is accomplished by a pair of large, fluid operated, double acting cylinders 56 which are respectively mounted on the flanges 24a of the base adjacent the right hand end of the structure as viewed in FIG. 1. The cylinders 56 are sufficiently large to provide the force required to reciprocate the rail section 32b longitudinally out of engagement with the end of the rail string 32a. Fluid is periodically supplied to opposite ends of the cylinders 56 to reciprocate the rail section 32b at a predetermined rate, thereby to heat the ends to be joined as described more fully below. At the end of a preselected heating period, the cylinders 56 are rendered effective to move the platen assembly 42 via a considerably higher force in order to complete the weld by forceably pushing the rail section 32b against the end of the string 32a. In order to supply large quantities of fluid at the required high pressures to accomplish the latter result, an auxiliary booster cylinder 58 is mounted in the base 24 beneath the platen 42. The booster cylinder 58 is connected with the upset cylinders 56 by a pair of fluid supply lines 60 and 62 best shown in FIGS. 2 and 4. When high pressure hydraulic fluid is supplied to the outer ends of the cylinders 56 the platen assembly 42 is moved forcefully and rapidly toward the left to complete the weld. Control means (not shown) are provided for effecting accurate control of the cylinders 56 to effect the desired rate of reciprocation of the platen assembly 42.

In order to control the rocking or pivotal movement of the platen assembly 40 about the bearing assembly 50, a ratio type worm gear motor assembly 64 is mounted on the outer end of the base 24 as is best shown in FIG. 1. The gear motor assembly 64 includes an upwardly extending actuating rod 64a which is movable vertically with respect to the base 24 in order to pivot the platen assembly about the bearing assembly 50 in either a clockwise or counter-clockwise direction (FIG. 1). A yoke 66 secured to the end of the rod 64a includes a pair of spaced apart upstanding legs 66a for supporting a transverse pin 68 in order to provide means for operatively interconnecting the rod 64a and a heavy bracket 70 mounted at the outer end of the platen assembly 40 (FIG. 1). As is best shown in FIG. 8 the upstanding legs of the yoke 66 are spaced apart by a distance somewhat greater than the lateral width of the bracket 70 in order to permit laterally transverse movement of the platen assembly 40 as a unit with respect to the base 24 in a manner described below. A pair of bellows 72 are mounted on the pin 68 on opposite sides of the bracket 70 between the upstanding legs 66a of the yoke to insure that the bracket does not bind on the pin.

In order to move the platen assembly 40 laterally or horizontally as described above, the bearing assembly 50 includes a ratio gear drive motor assembly 74 similar to the motor unit 64 and mounted on the end of one of the stub axles 52 as is best shown in FIGS. 8 and 9. The gear motor assembly 74 includes an actuating rod 74a which is connected to the outer end of the adjacent stub axle 52 and the rod is movable laterally by the action of the motor which may be manually and selectively actuated to move the rod inwardly or outwardly. The motor 74 thus provides drive means for accurately controlling lateral movement of the platen structure 40 to permit the end of the rail string 32a to be moved horizontally relative to the end of the rail section 32b in order to effect the horizontal alignment.

The longitudinally movable platen assembly 42 includes an upper section 76 and a lower or base section 78 which may be disassembled from each other but which are normally bolted together by a plurality of bolts 80. The upper platen section 76 includes a pair of parallel vertical side plates 82 spaced apart by a top spacer plate 84 and by a lower or bottom spacer plate 86 (FIG. 3). The lower platen section 78 likewise includes a pair of spaced apart parallel side plates 88 which are maintained in spaced apart relation by a horizontal spacer or base 90. In order that the upper platen section 76 and the lower platen section 78 may be easily and firmly joined together the upper platen section includes a pair of longitudinally and outwardly extending horizontal flanges 92 along the lower edges of the side plates 82 and these flanges are adapted to abut and rest on similar flanges 94 formed along the upper edges of the side plates 88 on the lower platen section 78. The longitudinally extending supporting flanges 42a previously mentioned are attached to the outer surfaces of the side plates 88 beneath the flanges 94.

The side plates 88 extend downwardly between and are spaced inwardly of a pair of vertically extending longitudinal side plates 96 of the base 24 and a plurality of cross members or spacers 98 are provided between the spaced apart side plates 96. A plurality of vertically etxending outer stiffening members 100 are welded to the exterior surfaces of the side plates and these stiffening members 100 extend downwardly of the flanges 24a. In addition, a pair of lower stiffening rails 102 extend longitudinally along the bottom edge of the base (FIGS. 1, 2 and 3).

The upper flanges 24a are additionally strengthened by a pair of outer longitudinal side plates 104 welded to the underside of the flanges and to the outer edges of the vertical stiffening ribs 100. The side plates 82 of the upper platen section 76 have a plurality of vertical stiffening ribs 106 on their outer surfaces and the side plates 88 of the lower platen section 78 are similarly provided with vertical and horizontal stiffening ribs 108 and 110 on their outer surfaces so that the assembled platen 42 is strong and rugged.

Referring specifically to FIG. 4, the upper section 76 of the platen assembly 42 is provided with a vertical forward end plate 112 which faces the platen assembly 40 and the lower platen section 78 includes a similar forward end plate 114 vertically aligned with the end plate 112. The respective platen sections 76 and 78 also include rear end plates 116 and 118 to provide additional bracing between the respective pairs of side plates 82 and 88.

The forward end plate 112 supports an upper electrode assembly 120 which includes an electrode 120a adapted to engage firmly the crown or running surface of the rail section 32b. The forward end plate 114 supports a similar lower electrode assembly 122 in vertical alignment with the upper assembly 120. The lower assembly 122 includes an electrode 122a which is adapted to engage and establish low resistance electrical contact with the lower surface of the base of the rail section 32b. The electrode 120a and 122a are movable toward and away from the surfaces of the rail section 32b and, to this end, fluid operated cylinders are provided in the respective electrode assemblies. The latter cylinders may be rendered effective to move the electrodes against the rail section with the desired contact pressure or to retract the electrodes to the position shown in dotted lines in FIG. 4 after a weld has been completed.

In order to clamp and hold the rail section 32b against longitudinal, vertical or horizontal movement with respect to the platen assembly 42 during alignment welding and shearing of the upset material, the platen assembly includes a pair of spaced apart, identical vertical clamping assemblies 124 and 126 and also includes a pair of spaced part, identical, horizontal clamping assemblies 128 and 130. Each vertical clamping assembly 124 and 126 includes a lower, fixed, clamp or pad 132 adapted to engage and support the under surface of the rail section 32b. The two fixed clamping pads are fixedly positioned on the heavy spacer plate or base 90 extending between the side plates 88 of the lower platen section 78 as is best shown in FIG. 4. Each of the clamping assemblies 124 and 126 also includes a vertcially extending sleeve 134 for guiding the vertical sliding movement of a piston rod 136 having an upper clamping pad 136a mounted on its lower end.

In order to move the upper clamping pad into or out of engagement with the rail section 32b, a pair of large fluid operated cylinders 138 are mounted on the top plate 84 of the upper section of the platen assembly 42. When pressurized fluid is introduced into the upper end of the cylinders 138 the rods 136 and the upper clamping pads 136a thereon are forced downwardly until the two pads engage the upper running surface or crown of the rail section 32b whereupon the rail section is forced downwardly against the two fixed clamps 132.

The downward force exerted by the hydraulic cylinders 138 is sufficiently large to hold the rail against movement vertically with respect to the platen 42. When hydraulic fluid is introduced into the lower ends of the cylinders 138 the rods and the upper clamps are moved upwardly out of engagement with the rail section 32b to a retracted position shown in broken lines in FIGS. 3 and 4.

Each of the horizontal clamping assemblies 128 and 130 includes a pair of spaced apart, horizontally aligned cylinder assemblies 140 and 142 which are mounted on opposite sides of the platen 42 with their inner ends supported by the respective side plates 88 of the lower platen section 78. For this purpose a pair of tubular mounting sleeves 144 and 146 are welded to the side plates 88 in alignment with openings formed therein to permit their associated piston rods to move inwardly toward the rail section 32b. The horizontal clamping cylinder assemblies 140 and 142 are somewhat smaller in diameter than the vertical clamping cylinders 138 so that the clamping force exerted by the horizontal clamps against the rail section 32b is less than that exerted by the vertical clamps. This will permit movement of the rail section 32b vertically when fluid is applied to the vertical clamping cylinders even with the horizontal clamps actuated. The forward ends of the clamping cylinders 140 are bolted or otherwise secured to the outer ends of the sleeves 144 mounted on the platen side plates 88 and each cylinder includes a piston rod (as indicated at 140a in FIG. 3) carrying a removable clamp 143 on its end for engaging the side surface of the rail head. When fluid is supplied to the outer ends of the cylinder the clamps 143 are moved inward into clamping engagement with the rail section 32b and when fluid is supplied to the inner ends of the cylinders the rod clamps are retracted to the positions shown in broken lines in FIG. 3.

Each of the opposing horizontal cylinder assemblies 142 include fixed outer sleeves secured to the mounting sleeves 146 and a hydraulic cylinder (not shown) similar to the cylinder 140 is mounted for sliding movement within the fixed outer sleeve. The position of the inner cylinder within the outer sleeve is controlled by a hand wheel and screw assembly 148 which may be manually adjusted to preposition the inner cylinder with respect to the horizontal center line of the platen. The inner cylinder referred to includes a piston rod 150 with a clamp 152 on its end for engagement with the side surface of the rail head on the rail section 32b. By adjustment of the hand wheel assemblies 148 before hydraulic fluid is supplied, the rail section 32b may be accurately centered in a longitudinal plane coinciding with the longitudinal center plane of the platen 42 when the cylinders are operated.

After each rail section 32b has been moved longitudinally into the platen assembly 42, the horizontal clamping assemblies 128 and 130 are first rendered effective to move the clamps 143 and 152 inwardly to engage opposite sides of the rail head, thereby centering the longitudinal axis of the rail section with the longitudinal axis of the platen assembly 42. With the rail section so held by the horizontal clamping assemblies (128 and 130) the vertical clamping assemblies 124 and 126 are rendered effective to move the clamping members 136a downwardly against the crown or running surface of the rail section.

The rail section 32b is then firmly held in place and is restrained against any longitudinal, vertical or horizontal movement relative to the platen assembly.

As each rail section 32b is moved longitudinally from right to left into a welding position in the platen assembly 42 it is supported on a vertically movable roller assembly 154 which is mounted on the spacer member 90 between the sides walls 88 as is best shown in FIGS. 4 and 11. The support roller assembly 154 includes a laterally extending roller vertically movable between a retracted position (FIG. 4) and an upwardly extended position (FIG. 11) wherein the undersurface of the rail section is supported above the fixed clamping members 132. In order to move the support roller assembly 154 between its retracted and extended position as shown, a small fluid cylinder 156 mounted on the spacer 90 is connected thereto. When a rail section 132b is being moved into the platen assembly 42 fluid is supplied to the lower end of the cylinder 156 to extend the roller assembly 154 upwardly. After the rail section 32b has been moved into the platen assembly 42 and is in the proper longitudinal position shown in FIGS. 1 and 4 of the drawings, fluid is supplied to the upper end of the cylinder 156 to retract the roller assembly 154 downwardly thus permitting the rail section to rest on the two lower fixed clamping members 132.

The platen assembly 40 includes an upper section 158 bolted to a lower section 160. As is best shown in FIG. 6, the upper platen section 158 includes a pair of parallel, spaced apart vertical side plates 162 and a plurality of horizontally extending inner spacer members 164 joining the side plates. As illustrated in FIGS. 1 and 6 the side plates 162 are additionally stiffened by external vertically extending ribs 166 and the upper platen section 158 also includes a pair of longitudinally extending, horizontal lower flanges 168 along the lower edges of the side plates 162. The flanges 168 are adapted to abut and rest upon longitudinally extending, spaced apart upper flanges 170 formed on the lower platen section 160 and respective pairs of flanges 168 and 170 are fastened together by a plurality of bolts 172.

The lower platen section 160 includes a pair of spaced apart, vertically extending side plates 174 which are interconnected by a plurality of transversely extending inner spacers 176 (FIGS. 6 and 7) and the side plates 174, in addition, are strengthened by a plurality of external vertical stiffening ribs 180 and horizontal ribs 182.

When the upper platen section 158 and the lower platen section 160 are bolted together they form an outer cage-like structure for supporting a vertically movable inner platen structure 184 which is best shown in FIGS. 6, 7 and 8. The inner platen structure 184 is generally rectangular in cross-section (FIG. 6) and includes a pair of parallel, spaced apart vertical side plates 186 which are structurally interconnected by an upper spacer plate 188 and a lower spacer plate 190 as is best illustrated in FIGS. 6 and 7 of the drawings.

The inner platen structure 184 is movable vertically relative to the side plates 174 of the outer platen structure and is supported for vertical movement on the upper end of a vertically extending cylindrical pedestal 192. The pedestal 192 is mounted for vertical sliding movement in a fixed sleeve 194, which, in turn, is supported by the spaced plates 176 and extends upwardly through suitable openings provided therein. The spacer plates are mounted adjacent the lower end of the lower platen section 160 and are structurally interconnected (FIGS. 6 and 7) to provide the desired strength. The pedestal 192 includes an annular flange 192a spaced below its upper end and the flange seats within a recess in the lower surface of the spacer 190. The pedestal 192 also includes a stub portion 192b which extends upwardly of the flange 192a into an opening provided in the spacer 190.

The inner platen structure 184 is thus supported for vertical movement relative to the outer platen structure by means of the sliding pedestal 192. In order to selectively control the vertical movement of the pedestal 192 within the sleeve 194 and thereby accurately adjust the vertical position of the rail string 32a with respect to the rail section 32b so that the ends to be welded will be in precise matching vertical alignment, a ratio gear motor drive assembly 196 mounted on the lower end of the sleeve 194 may be actuated to drive the pedestal 192 upwardly or downwardly as required. The gear motor 196 is similar in operation to the gear motors 64 and 74 previously described and is selectively operable by a manual control (not shown) to move the pedestal 192 as required. If, for example, the upper running surface or crown of the rail head on the rail string 32a is misaligned below the running surface of the rail head on the rail section 32b the gear motor 196 is energized to raise the pedestal 192 until the running surfaces are even whereupon the motor is de-energized. The pedestal 192 is keyed within the sleeve 194 to prevent rotation therebetween and accordingly the inner platen structure 184 is always maintained with its vertical side plates 186 in parallel relation with the vertical side plates 162 and 174 of the outer platen structure.

From the foregoing description it will be observed that the outer platen structure including the upper and lower sections 158 and 160 may be pivoted or rocked as a unit about a horizontal axis to bring the rail ends to be welded into parallel alignment and is also adjustable laterally in a horizontal direction to insure accurate alignment between the longitudinal axes of the rail sections to be joined. By properly making the horizontal, vertical and rocking adjustments described above the rail ends to be welded may be accurately and precisely aligned in closely facing matching relation to insure uniform welding penetration throughout the cross section of the rail.

The platen assembly 40 is equipped with vertical and horizontal clamping assemblies identical with those on the platen assembly 42 and these clamping assemblies are mounted on the inner platen structure 184. The electrode assemblies and the sets of clamps on the platen assembly 40 are identical to the corresponding components on the platen assembly 42 and, hence, the corresponding components have been assigned the same reference numerals to avoid repetition. The inner platen structure 184 includes an upper, forward end plate 198 secured to the upper spacer 188 facing and extending parallel to the forward end plate 112 of the platen assembly 42. Similarly, a lower, forward end plate 200 is secured to the lower spacer or base 190 beneath the rail string 32a in parallel facing relation with the lower, forward end plate 114 of the platen assembly 42. The forward end plates 198 and 200 support a pair of vertically movable upper and lower electrode assemblies 120 and 122 identical in construction to the correspondingly numbered electrode assemblies on the platen assembly 42. Operation of the vertical and horizontal clamping assemblies and the electrode assemblies on the platen 40 is like that of the corresponding assemblies on the platen 42 and accordingly these operations will not be described. The electrode assemblies 120 and 122 on the platen 40 are engageable with the rail string 32a a short distance from the weld area 34 so that current can flow between these assemblies and those engaging the rail section 32b and through the aligned ends of the rails.

The fixed clamping members 132 of the vertical clamping assemblies 124 and 126 are mounted in suitable recesses provided on the upper surface of the lower spacer 190. The upper and lower clamping members of the vertical clamping assemblies 124 and 126 are movable with the inner platen structure 184 and, in addition, the rods 136 of these clamping assemblies are movable vertically relative to the fixed clamping members 132.

The sleeves which guide the plungers 136 are secured at their lower ends to the upper spacer 188 and accordingly move vertically relative to the upper section 158 of the outer platen structure. A pair of outer guide sleeves 202 are mounted on the spacer between the side plates of the upper platen section 158 to guide the sleeves 134 as they are moved with the inner platen structure 184. The horizontal clamping assemblies 128 and 130 on the platen assembly 40 are supported by the inner platen structure 184 and the inner ends of the respective, oppositely aligned components are attached to the respective side plates 186. Because the horizontal clamping assemblies 128 and 130 are movable vertically with the inner platen structure 184, suitable elongated openings 210 are provided in the side plates 174 of the lower platen section 160 as is best shown in FIGS. 1, 6, 7 and 8 to accommodate this movement. In order to support the rail string 32a as it is moved longitudinally through the platen assembly 40 following a welding operation there are provided a pair of spaced apart roller assemblies 154 similar to the correspondingly numbered roller assemblies previously described. As is best shown in FIGS. 7 and 12 the pair of roller assemblies 154 on the platen assembly 40 are mounted for vertical movement on the lower spacer 190 and small hydraulic cylinders 156 are provided to raise and lower these assemblies between their rail supporting positions shown in FIG. 12 wherein the bottom of the rail string is raised above the fixed clamping members 132 so that the string can be moved along the platen assembly 40 when the clamps and electrodes are disengaged.

In a normal welding operation in the apparatus 20 of the present invention after the base structure 24 has been initially moved longitudinally along the rails 30 to properly position the apparatus on the car floor 22, a pair of rail sections are fed into the apparatus from right to left and are positioned with their abutting ends approximately midway between the platens 40 and 42 as shown in FIG. 1. During longitudinal movement of the rail sections into the apparatus the rail support roller assemblies 154 are raised by the cylinders 156 to support the rail string above the fixed clamping members 132 and all of the vertical and horizontal clamping assemblies and electrode assemblies are in their retracted positions. The rail supporting rollers 154 are then lowered by the cylinders 156 until the rail sections rest on the lower fixed clamps 132. The hand wheel assemblies 148 of the horizontal clamping assemblies 128 and 130 on both platen assemblies 40 and 42 are adjusted as previously described and these clamping assemblies are then actuated. The vertical clamping assemblies 124 and 126 on the platen assemblies are then actuated to seat the rail sections against the fixed clamps 132 thereby to restrain both rail sections against longitudinal, lateral and vertical movements relative to the respective platens 40 and 42. If the longitudinal axes of the rail sections 32a and 32b are misaligned lateral adjustment of the platen assembly 40 is accomplished by operating the gear motor 74 as previously described.

Referring to FIG. 13, which shows in exaggerated form a rail section 32a having an end sheared at an angle which is not square or normal to its longitudinal axis, if this condition is encountered the platen assembly 40 is pivoted or rocked about the bearing assembly 50 in a clockwise direction (FIG. 1) by operation of the gear motor 64 until the end face of the rail 32a lies parallel with the end face of the adjacent rail section 32b which is fixedly held in the platen 42. In effect, the end of the rail 32a is being bent slightly to achieve the desired positioning of the end face. After this alignment has been accomplished the inner platen structure 184 is moved up or down by the gear motor 196 until the ends of the rail sections are in perfectly matched alignment with the crowns or running surfaces of the rail sections aligned. After the alignment procedure is completed, the upper and lower electrode assemblies 120 and 122 on the two platens are energized. The cylinders 56 are next actuated to reciprocate the platen assembly 42 to cause the rail section 32 to periodically engage the end of the rail 32a whereupon current flows between the electrode assemblies on the two platens and through the rail ends. When the rail section 32b moves away from the end of the rail 32a an arc is drawn between the rail ends which further increases the heating. The rail section 32b is moved back and forth several times against the rail section 32a to repeatedly make and break the electrical circuit until the desired temperature is attained. When the desired welding temperature is obtained, high pressure fluid is supplied to the outer ends of the cylinders 56 to move the platen assembly 42 rapidly with great force toward the left and thereby force the end of the rail section 32b against the end of the rail 32a held in the platen assembly 40. The force between the ends of the rail sections is controlled by the hydraulic pressure supplied to the cylinders 56 and this force is maintained during the welding period until the welding cycle is completed. Because of the accurate alignment between the ends of the rail sections a strong weld is produced and the penetration of the weld is uniform throughout the entire cross-section of the rail ends that are joined.

When the weld is completed in the manner described above, upset or flash material is formed around the weld area 34 and in order to reduce the amount of grinding required to provide a smooth joint, it is desirable to remove most of this excess material or flash while the weld is still hot and soft and before the rail string is moved. Undesired movement of the rail sections immediately after the weld is formed could weaken the weld and also cause a permanent misalignment and accordingly while the weld is cooling and solidifying it is desirable to eliminate the possibility of movement until the weld has hardened. However, during this cooling period it is easier to remove the excess upset or flash material.

In accordance with an important feature of the present invention, the excess material is sheared immediately after the upset is formed and while maintaining both rail sections in their clamped position. To this end, a longitudinally extending, hollow shear box assembly 220 (FIG. 10) is mounted on the platen assembly 42 for longitudinal movement with respect thereto in order to shear the upset material around the weld area 34. The shear box assembly 220 is best shown in FIGS. 3, 4, 5 and 10 of the drawings and includes a plurality of shearing knives 222 positioned at the forward end thereof. These shearing knives are generally similar to the knives shown in the aforementioned Ansel Patent No. 3,081,673. More specifically, a plurality of individual shearing knives 222 are provided with the cutting edges shaped to conform closely to the cross sectional shape of the rail sections in an arrangement like that shown in FIG. 3 of the aforementioned Ansel patent. In one embodiment of the invention six individual knife members are used and each is removable independently of the other to facilitate repair or replacement of a knife if its cutting edge becomes dull or is broken. The shearing knives 222 are mounted on the outer face of a forward roller assembly 224 which includes a pair of side rollers 226 biased inwardly to seat against the side surfaces of the rail head and which further includes an upper roller 228 seating on the crown or running surface of the rail. The roller assembly 224 in turn is supported on a forward end plate 230 having an opening therein to accommodate the rail passing longitudinally therethrough. The end plate 230 is welded or otherwise secured to the forward ends of a pair of vertically disposed, spaced apart side plates 232. Shear box assembly 220 includes a rear end plate 234 for supporting a rear roller assembly 236. The rear roller assembly 236 includes upper and lower rollers 238 and 240 and a pair of horizontally displaced side rollers 242 respectively bearing against opposite sides of the rail head. The end plates 230 and 234 are formed with openings therein of sufficient size to accommodate rail sections of different cross sectional dimensions customarily welded in the apparatus 20 and the roller assemblies 224 and 236 may be easily changed along with the shearing knives 222 to accommodate each of these different rails.

The shear box end plates 230 and 234 are welded or otherwise joined to the opposite ends of the longitudinally extending, vertical side members 232 and the side members are strengthened laterally a plurality of longitudinal ribs 244 best shown in FIG. 5. In order to permit longitudinal movement of the shear box assembly between a retracted position (FIG. 5) wherein the shearing knives 222 are spaced to the right of the weld area 34 and an advanced or shearing position shown in FIG. 10 without releasing the vertical clamping assemblies 124 and 126 the forward portions of the shear box structure between the vertical side plates 232 is open at the top and bottom. The rearward portion of the shear box, however, includes a lower spacer plate 250 disposed beneath the rail section and welded to the vertical side members 232. An upper or top spaced 252 is positioned above the rail section to cooperate with the side plates and the spacer plate 250 to form a channel-like structure at the rear of the sheer box assembly.

Each side plate 232 is formed with a pair of spaced apart, horizontally aligned openings 232a for respectively accommodating the clamps 143 and 152 of the horizontal clamping assemblies 128 and 130 on the platen assembly 42. The openings 232a are so positioned that the clamps can pass through the side plates and into engagement with opposite sides of the rail head when the shear box assembly 220 is in the retracted position shown in FIG. 5 of the drawings.

During a welding operation the vertical clamping assemblies 124 and 126 and the horizontal clamping assemblies 128 and 130 on the platen assembly 42 are firmly engaged with the rail section 32b as described above. After the welding has been completed the vertical clamping assemblies 124 and 126 are still maintained in rail clamping position while the weld cools somewhat but the horizontal clamping assemblies 128 and 130 on the platen assembly 42 only and the two electrode assemblies on both platens are retracted so that the clamps 143 and 152 move outwardly through the openings 232a and away from the side plates 232 of the shear box assembly 220, thereby to permit the shear box assembly to advance. The force exerted by the vertical clamping assemblies 124 and 126 of the platen assembly 42 is still sufficient to restrain the rail section 32b against movement. Since both of the rail sections 32a and 32b are clamped securely against movement within the respective platen assemblies during the shearing operation, the rail sections can not move out of alignment. This results in more accurate shearing of the joint and requires less shearing force because the shearing action occurs immediately after the weld and while the weld is still hot.

The shear box assembly 220 is supported on the platen assembly 42 for longitudinal movement relative thereto by a plurality of support rollers 260 engaging the lower edges of the side plates 232 (FIGS. 4 and 10). One large roller 260 is mounted on the spacer member 90 and a pair of smaller rollers 260 extend inwardly of the platen side members 88 as is best shown in FIG. 5.

In order to advance the shear box assembly 220 from the retracted position shown in FIG. 4 and to drive the knives 222 through the weld area 34, a pair of horizontally extending cylinders 270 are provided one above and the other below the shear box assembly. The closed ends of the cylinders 270 are pivotally secured to respective lateral cross members and brackets 272 which extend between the side plates of the upper and lower platen sections 76 and 78. Each cylinder 270 includes a rod 270a which is pivotally connected to a yoke assembly 282 connected to the rearward or outer end of the shear box assembly.

During the welding operation the shear box assembly 220 is maintained in its rearward or retracted position so that the openings 232a are aligned with the horizontal clamps 143 and 152. As soon as the welding has been completed the horizontal clamping assemblies 128 and 130 are retracted as previously described and pressurized fluid is introduced to the outer ends of the cylinders 270 to move the shear box assembly 220 from right to left. After the shearing box assembly has been fully advanced to complete the shearing operation, pressurized fluid is introduced into the closed or left ends of the cylinders 270 to move the shear box assembly 220 toward the right to the retracted position.

After the shearing has been completed and the weld has cooled sufficiently the vertical clamping assemblies 124 and 126 on both platens 40 and 42 are released as are the horizontal clamping assemblies 128 and 130 on the platen 40. Prior to movement of the rail string 32a the support rollers 154 are extended upwardly to lift the bottom of the rail above the fixed clamps 132 whereupon the rail string is moved until the end thereof is properly positioned between the platens. During this time another rail section 32b is moved into position adjacent the rail string and the above described aligning, clamping, welding and shearing cycle is repeated.

The method and apparatus of the present invention provides for producing uniform and extremely strong welded joints between individual rail sections even though the end faces of the rail sections may not be exactly square or normal to the longitudinal axes thereof. In addition, the rail sections that are welded together are positively held in aligned position during the shearing of the upset material at the welded joint while still hot and, accordingly, less shearing force is required, time is saved and there is very little possibility of misalignment of the welded rail sections immediately after the welding has been completed. A cycle of operation of the welding apparatus 20 of the present invention is relatively short and the apparatus can be operated to produce high quality welds at production rates not heretofore obtainable.

While a particular embodiment of the present invention has been illustrated and described it will be recognized that many modifications and changes will readily occur to those skilled in this art and it is, therefore, intended by the appended claims to cover all such changes and modifications which fall within the spirit and scope of the invention.

What is claimed and desired to be secured by Letters Patent of the United States is:

1. A method of welding longitudinally disposed rail sections together in end to end relationship to form a continuous rail, which comprises the steps of holding said rail sections against relative movement with the rail sections in substantially exact longitudinal alignment and with their adjacent ends in closely spaced facing relationship, rocking one of said rail sections about an axis extending transversely thereof, thereby to bring its end surface into precise parallel facing relationship with the adjacent end surface of the other rail section, relatively moving said rail sections vertically in order accurately to align the ends of said rail sections in directly matched facing relation, heating the aligned ends of said rail sections to welding temperature, and relatively moving said rail sections longitudinally while held against vertical and lateral movement, thereby to force the heated ends of said rail sections together to form a weld therebetween.

2. The method of claim 1, including the step of removing the upset material formed around the weld joint between the rail section ends while said rail sections are restrained against longitudinal, lateral and vertical movement.

3. The method of claim 2, wherein said upset material is sheared off by a shearing action effected longitudinally of said rail sections and around the surfaces thereof.

4. The method of claim 1, wherein said directly matched facing relation is obtained by aligning the running surface of the rail heads of the respective sections to intersect at the weld area.

5. Apparatus for welding longitudinal rail sections together in end to end relationship to form a continuous rail, comprising a base, first means mounted on said base for holding one of said rail sections against longitudinal, vertical and lateral movement during welding of the ends of said rail sections together, second means mounted on said base for holding the other of said rail sections against lateral and vertical movement during said welding, means for moving said second means longitudinally of said one rail section along said base to force the ends of said rail sections together in order to form a welded joint between the adjacent rail section ends, and pivot means supporting said first means on said base for pivotal movement about a horizontal axis normal to said one rail section for aligning the end thereof in parallel facing relation to said other rail section held by said second means.

6. The apparatus of claim 5, including means for selectively adjusting and maintaining the pivotal position of said one rail section held in said first means relative to the other rail section in said second means.

7. The apparatus of claim 5, wherein said first means includes clamping means movable normal to the longitudinal axis of said one rail section between a retracted position and a clamping position engaging said one rail section, and means for moving said clamping means when in a clamped position in a direction normal to the longitudinal axis of said one rail section, thereby accurately to align the end thereof in matched relationship with the end of said other rail section.

8. The apparatus of claim 5, wherein said first means includes platen means mounted on said base for pivotal movement about an axis laterally transverse to said one rail section, and a pair of rail clamping means supported by said platen means for movement normal to said one rail section between a retracted position and a rail clamping position engaging said one rail section, one of said rail clamping means being movable normal to the axis of movement of the other clamping means.

9. The apparatus of claim 8, wherein each of said clamping means includes a fixed clamping member and an opposite clamping member movable with respect thereto to clamp and hold said rail section, and support means on said platen selectively movable thereon in a direction normal to said one rail section, said fixed clamping member of one of said clamping means being fixedly secured on said support means for movement therewith.

10. The apparatus of claim 8, including means for selectively controlling the pivotal position of said platen means about said laterally transverse axis in order to align the end of said one rail section parallel with the facing end of the other rail section.

11. The apparatus of claim 5, wherein said second means includes second platen means mounted for longitudinal sliding movement on said base toward and away from said first means, and a pair of second rail clamping means supported by said second platen means for movement normal to said other rail section between a retracted position clear thereof and a rail clamping position engaging said other rail section, one of said second rail clamping means being movable along a path normal to the axis of movement of the other of said second clamping means.

12. The apparatus of claim 11, including upset shearing means mounted for reciprocation on said second means longitudinal of said rail section held thereby, said shearing means comprising a plurality of knife members mounted at one end of an elongated shear box extending longitudinally of said rail section, said knife members having knife edges conforming to the cross-sectional shape of said rail sections, said elongated shear box supported on said second platen means for travel between a retracted position wherein said knife members are spaced longitudinally in one direction from said welded joint and movable past said joint for shearing the same while said other rail section is clamped by one of said rail clamping means.

13. Apparatus for welding longitudinal rail sections together in end to end relationship to form a continuous rail, comprising a base extending longitudinally of the rail sections, a first platen mounted on said base for pivotal movement about an axis laterally transverse of said rail sections, a second platen mounted on said base for movement longitudinally thereof toward and away from said first platen, a plurality of first clamping means supported on said first platen for holding one of said rail sections against longitudinal, lateral and vertical movement with respect thereto, a plurality of second clamping means supported on said second platen for holding the other of said rail sections against longitudinal, lateral and vertical movement with respect thereto, shear box means having knife means at one end thereof mounted on said second platen for longitudinal movement with respect thereto for shearing the upset material from around the weld area, said shear box means including longitudinally extending structure for supporting said knife means, said structure being spaced from said other rail section clear of at least one of said second clamping means when engiging said rail section, and means for selectively controlling the pivotal movement of said first platen about said laterally transverse axis, thereby to align the end of said one rail section in parallel facing relation with the end of said other rail.

14. The apparatus of claim 13, including support means for said first clamping means mounted on said first platen for movement vertically thereon to place the ends of said rail sections in matched vertical alignment.

15. The apparatus of claim 13, wherein the longitudinal structure of said shear box means includes a pair of side members spaced on opposite sides of said rail sections, said side members including openings therein permitting engagement of said rail therethrough by at least one of said second clamping means.

16. Apparatus for welding longitudinal rail sections together in end to end relationship to form a continuous rail, comprising a base, first means mounted on said base for holding one of said rail sections against longitudinal, vertical and lateral movement during the welding of said rail sections, second means mounted on said base movable longitudinally of said rail sections for holding another rail section against lateral and vertical movement during said welding, and mounting means for mounting said first means on said base for pivotal movement about an axis normal to the one rail section held thereby, said axis being remotely spaced from the end of said one rail section, said first means including means for selectively controlling the angular position of said one rail section held therein about said pivot axis thereby to align the end thereof in parallel facing relation with the end of the other rail section to be welded thereto.

17. The apparatus of claim 16, wherein said first means includes clamping means movable in a direction normal to the longitudinal axis of said one rail section between a retracted position and a clamping position engaging said one rail section, and means for moving said clamping means when in a clamped position in a direction normal to the longitudinal axis of said one rail section for accurately aligning the running surfaces of said rail sections to intersect at the weld formed between the ends of said rail sections.

References Cited

UNITED STATES PATENTS

| | | | |
|---|---|---|---|
| 2,193,490 | 3/1940 | Rehse | 219—101 |
| 2,250,869 | 7/1941 | Jones et al. | 219—101 |

(Other references on following page)

UNITED STATES PATENTS

| | | | |
|---|---|---|---|
| 2,297,893 | 10/1942 | Jones | 219—101 |
| 2,459,625 | 1/1949 | Copp | 219—101 |
| 2,787,698 | 4/1957 | Schlatter et al. | 219—97 |
| 2,911,516 | 11/1959 | Cox | 219—101 |
| 2,945,117 | 7/1960 | Harris et al. | 219—97 |
| 3,030,494 | 4/1962 | Baer et al. | 219—101 |
| 3,081,673 | 3/1963 | Ansel | 219—101 |
| 3,204,079 | 8/1965 | Cox | 219—101 |

JOSEPH V. TRUHE, Primary Examiner

W. DEXTER BROOKS, Assistant Examiner